United States Patent Office 2,957,120
Patented Oct. 18, 1960

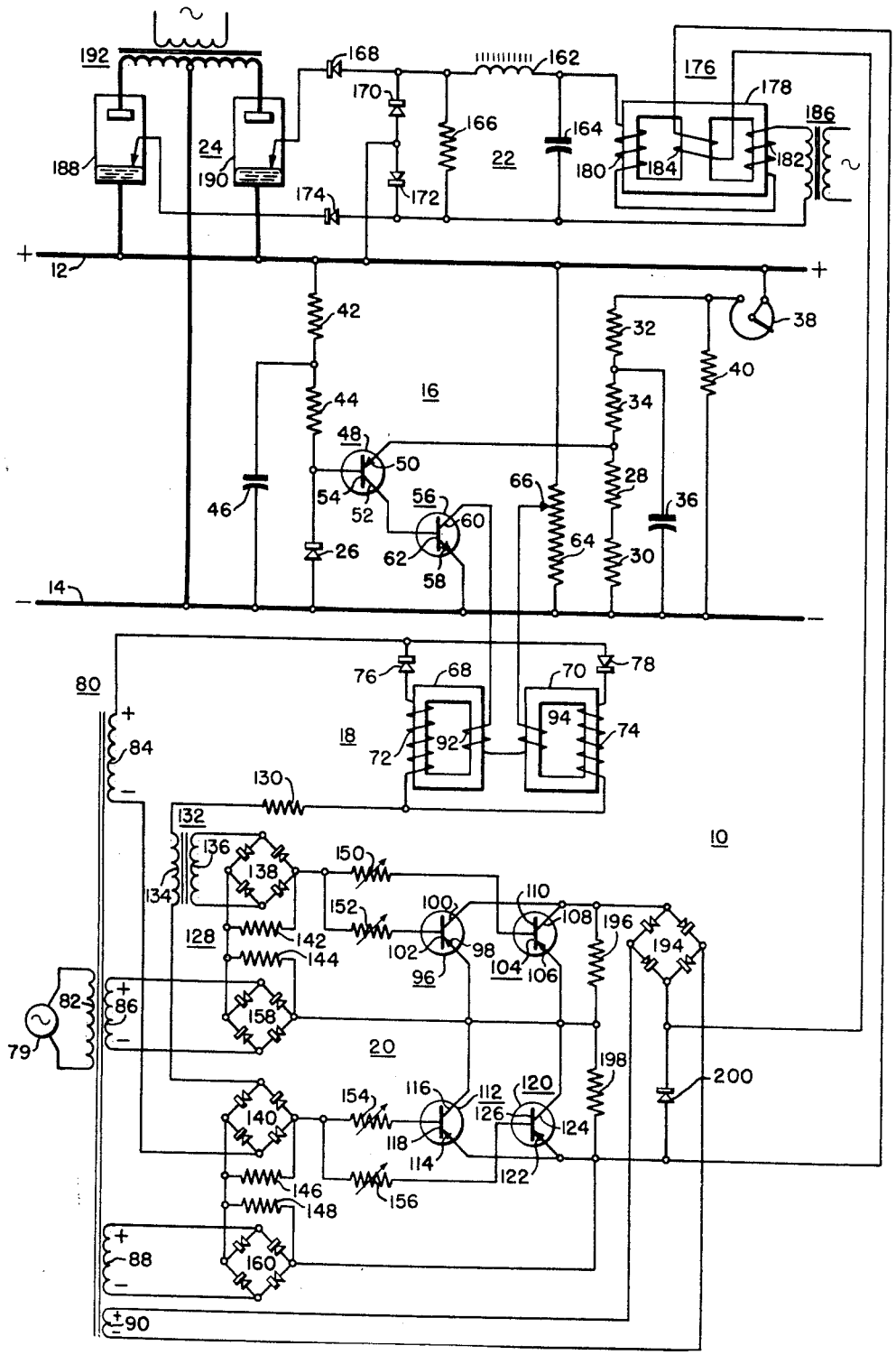

2,957,120

CONTROL APPARATUS

John F. Reuther, Swissvale, Pa., assignor to Westinghouse Electric Corporation, East Pittsburgh, Pa., a corporation of Pennsylvania Filed Dec. 29, 1955, Ser. No. 556,138

7 Claims. (Cl. 321—18)

This invention relates to electrical control apparatus and, more particularly, to regulator systems.

In many types of control systems it is desirable that the output signal vary linearly with changes in the magnitude of the input signal. Further, from a maintenance standpoint the control systems should comprise static components. In addition to the above qualities, industry demands that in many of the applications the control systems have a high speed of response.

An object of this invention is to provide a new and improved electrical control system.

Another object of this invention is to provide a control system, the magnitude of whose output signal varies linearly with changes in the magnitude of its input signal.

A more specific object of this invention is to provide for so controlling a switching transistor from a magnetic amplifier and for so synchronously applying alternating voltages to a load winding of the magnetic amplifier and to a load circuit controlled by the switching transistor that the output current to the load varies linearly with changes in the input control current to the magnetic amplifier.

Another object of this invention is to provide a control system having a high speed of response.

A further object of this invention is to provide a control system comprising static components.

Other objects of this invention will become apparent from the following description when taken in conjunction with the accompanying drawing in which the single figure diagrammatically illustrates this invention.

Referring to the drawing, the invention is shown embodied in a regulator system 10 which is connected to maintain the direct-current voltage between bus conductors 12 and 14 substantially constant. In general, the regulator system 10 comprises a sensing circuit 16 for producing a direct-current error signal which is a measure of the deviation of the direct-current voltage between the bus conductors 12 and 14 from its regulated value; a magnetic amplifier 18 responsive to the direct-current error signal; a switching circuit 20 responsive to the output of the magnetic amplifier 18; a phase-shifting circuit 22 controlled in accordance with the output of the switching circuit 20; and an ignitron rectifier circuit 24 responsive to the output of the phase-shifting circuit 22 for controlling the magnitude of the direct-current voltage between the bus conductors 12 and 14.

In particular, the sensing circuit 16 comprises a Zener diode 26. During operation, the direct-current voltage across the Zener diode 26 remains substantially constant since the voltage applied to the Zener diode 26 is always of greater magnitude than its Zener breakdown voltage. The substantially constant direct-current voltage across the Zener diode 26 is compared with a measure of the direct-current voltage between the bus conductors 12 and 14, the latter voltage appearing across resistors 28 and 30. The resistor 30 is a temperature-compensating resistor which in operation, due to temperature changes, functions to cause the voltage across the resistors 28 and 30 to vary substantially the same amount that the voltage across the Zener diode 26 varies due to temperature changes.

In order to provide during operation the proper magnitude of combined voltage across the resistors 28 and 30, resistors 32 and 34 are provided. The resistors 32 and 34 also cooperate with a capacitor 36 and form a T-filter for filtering the voltage applied to the resistors 28 and 30. This prevents undesirable signals from being applied to the control circuit of the magnetic amplifier 18.

A rheostat 38 is provided in order that the output voltage between the bus conductors 12 and 14 can be varied. As illustrated, the rheostat 38 is connected in series circuit relationship with resistor 40 forming a potentiometer connected between the bus conductors 12 and 14 which feeds the series connected resistors 28, 30, 32 and 34.

In order to limit the magnitude of current through the Zener diode 26, resistors 42 and 44 are connected in series circuit relationship with the Zener diode 26, the series circuit being connected between the bus conductors 12 and 14. A capacitor 46 is connected between the bus conductor 14 and the junction point of the resistors 42 and 44. The capacitor 46 and the resistors 42 and 44 form a T-filter which filters the voltage applied to the Zener diode 26. This also prevents undesirable signals from being applied to the control circuit of the magnetic amplifier 18.

The error current produced by the difference in the direct-current voltages across the Zener diode 26 and the resistors 28 and 30 combined is amplified by a junction-type transistor 48 having an emitter electrode 50, a collector electrode 52, and a base electrode 54. The error current is essentially a linear function of the bus voltage error since the magnitude of the error current is determined by the bus voltage error and the values of resistors 32, 34, 28, 30, 40 and rheostat 38. In order to amplify the output of the transistor 48 and thus further amplify the error current a junction-type transistor 56, having an emitter electrode 58, a collector electrode 60, and a base electrode 62, is provided. The magnitude of the voltage applied between the emitter electrode 58 and the collector electrode 60 of the transistor 56 is limited to a safe value by means of a tapped-resistor 64 having a movable tap 66. In practice, the impedance of the resistor 64 is relatively high so as to obtain a high speed of response for the magnetic amplifier 18.

The magnetic amplifier 18 is a well known full-wave doubler-type magnetic amplifier and comprises magnetic core members 68 and 70 constructed preferably of rectangular loop core material. Load windings 72 and 74 are disposed in inductive relationship with the magnetic core members 68 and 70, respectively. Self-saturation for the magnetic amplifier 18 is produced by connecting self-saturating rectifiers 76 and 78 in series circuit relationship with the load windings 72 and 74, respectively. In order to form a doubler-type magnetic amplifier the series circuit including the load winding 72 and the self-saturating rectifier 76 is connected in parallel circuit relationship with the series circuit including the load winding 74 and the self-saturating rectifier 78. In operation, the load windings 72 and 74 of the magnetic amplifier 18 are alternately energized from an alternating-current source 79. A potential transformer 80 having a primary winding 82 and secondary winding sections 84, 86, 88 and 90 is responsive to the alternating-current source 79 and is interconnected with the load windings 72 and 74.

Control windings 92 and 94 are also disposed in inductive relationship with the magnetic core members 68 and 70, respectively. The control windings 92 and 94 are responsive to the amplified direct-current error signal produced by the sensing circuit 16 and are so disposed on their respective magnetic core members 68 and 70 that current flow therethrough produces magneto-motive forces which oppose the magnetomotive forces produced by the current flow through the associated load windings 72 and 74, respectively.

The switching circuit 20 comprises a semiconductive device, specifically a junction-type transistor 96 having an emitter electrode 98, a collector electrode 100, and a base electrode 102; a semiconductive device, specifically a junction-type transistor 104 having an emitter electrode 106, a collector electrode 108, and a base electrode 110; a semiconductive device, specifically a junction-type transistor 112 having an emitter electrode 114, a collector electrode 116, and a base electrode 118; and a semiconductive device, specifically a junction-type transistor 120 having an emitter electrode 122, a collector electrode 124, and a base electrode 126. In order to provide a relatively high current handling capacity for the switching circuit 20, the transistors 96 and 104 are connected in parallel circuit relationship with one another and the transistors 112 and 120 are connected in parallel circuit relationship with one another. On the other hand, in order to provide for a relatively high voltage handling capacity for the switching circuit 20, the transistor 96 is connected in series circuit relationship with the transistor 112 and the transistor 104 is connected in series circuit relationship with the transistor 120.

In operation, the transistors 96, 104, 112 and 120 operate in a switching mode and the time duration of their conductivity is proportional to the pulse width of the chopped sine-wave output current of the magnetic amplifier 18. Circuit means 128 is provided for interconnecting the series circuits of the magnetic amplifier 18, one of which includes the load winding 72 and the self-saturating rectifier 76 and the other of which includes the load winding 74 and the self-saturating rectifier 78, and the base and emitter electrodes of the transistors 96, 104, 112 and 120 with the secondary winding section 84 of the potential transformer 80 so that a current proportional to the pulse width and magnitude of the chopped sine-wave output current of the magnetic amplifier 18 flows through the base electrode and the emitter electrode of each of the transistors 96, 104, 112 and 120. The circuit means 128 includes a current-limiting resistor 130, a current transformer 132 having a primary winding 134 and a secondary winding 136, full-wave dry-type rectifiers 138 and 140, resistors 142, 144, 146, and 148, and variable resistors 150, 152, 154 and 156 which can be adjusted so as to change the distribution of the current flowing through the base and emitter electrodes of the transistors 104, 96, 112 and 120, respectively. The function of the current transformer 132 is to isolate the input voltage to the transistors 96 and 104 from the input voltage to the transistors 112 and 120.

As illustrated, the junction point of the load windings 72 and 74, of the magnetic amplifier 18, is connected to one of the input terminals of the rectifier 140 through the current-limiting resistor 130 and the primary winding 134 of the current transformer 132, the secondary winding 136 of the current transformer 132 being connected to the input terminals of the rectifier 138. The junction point of the self-saturating rectifiers 76 and 78 is connected to the upper end of the secondary winding section 84, as shown, while the lower end of the secondary winding section 84, as shown, is connected to the other input terminal of the rectifier 140. The resistors 142 and 146, which are of a relatively high value, are connected to output terminals of the rectifiers 138 and 140, respectively, to provide a path whereby the magnetic amplifier magnetizing current may flow and whereby the bias voltage described below may be applied to the transistor base electrodes 102, 110, 118 and 126. The rectifiers 138 and 140 function to rectify the chopped sine-wave output current of the magnetic amplifier 18 which then flows through the transistor base electrodes 102, 110, 118 and 126.

In order to bias the transistors 96 and 104 off while the magnetic amplifier 18 is being driven toward saturation and has substantially no output current, a voltage is developed across the resistor 144 of such polarity as to render during this portion of the operation the base electrodes 102 and 110 of the transistors 96 and 104 positive with respect to their respective emitter electrodes 98 and 106. The bias voltage developed across the resistor 144 is effected by a full-wave dry-type rectifier 158 whose input terminals are connected to the secondary winding section 86 of the potential transformer 80 and whose output terminals are connected to the resistor 144.

For the purpose of biasing the transistors 112 and 120 off while the magnetic amplifier 18 is being driven toward saturation and has substantially no output current, a voltage is developed across the resistor 148 of such polarity as to render during this portion of the operation the base electrodes 118 and 126 of the transistors 112 and 120 positive with respect to their respective emitter electrodes 114 and 122. The bias voltage developed across the resistor 148 is effected by a full-wave dry-type rectifier 160 whose input terminals are connected to the secondary winding section 88 of the potential transformer 80 and whose output terminals are connected to the resistor 148.

The reason the transistors 96, 104, 112 and 120 are biased off while the magnetic amplifier 18 is being driven toward saturation is to prevent leakage current from flowing from emitter to collector electrode in each of the transistors 96, 104, 112 and 120 while a relatively high voltage is being applied between the emitter and collector electrodes of each of the transistors 96, 104, 112 and 120. If the leakage current under such conditions were not prevented, excessive heating of the transistors 96, 104, 112 and 120 might take place causing damage thereto.

Once the magnetic amplifier 18 saturates and has an output current, the magnitude of the voltage across the resistor 142 becomes greater than the magnitude of the bias voltage across the resistor 144 and thus the resulting voltage across both the resistors 142 and 144 is of such a polarity as to render the emitter electrodes 98 and 106 positive with respect to their respective base electrodes 102 and 110 and therefore the transistors 96 and 104 become conductive. In like manner, once the magnetic amplifier 18 saturates and has an output current the magnitude of the voltage across the resistor 146 becomes greater than the magnitude of the bias voltage across the resistor 148 and thus the resulting voltage across both the resistors 146 and 148 is of such a polarity as to render the emitter electrodes 114 and 122 positive with respect to their respective base electrodes 118 and 126 and therefore the transistors 112 and 120 become conductive.

The circuit for applying a measure of the resulting voltage appearing across both the resistors 142 and 144 between the base electrode 102 and the emitter electrode 98 of the transistor 96 extends from the right end of the resistor 142, as shown, through the variable resistor 152, to the base electrode 102, and from the right end of the resistor 144, as shown, to the emitter electrode 98. The circuit for applying a measure of the resulting voltage appearing across both the resistors 142 and 144 between the base electrode 110 and the emitter electrode 106 of the transistor 104 extends from the right end of the resistor 142, as shown, through the variable resistor 150 to the base electrode 110, and from the right end of the resistor 144, as shown, to the emitter electrode 106.

The circuit for applying a measure of the resulting voltage appearing across both the resistors 146 and 148 between the base electrode 118 and the emitter electrode 114 of the transistor 112 extends from the right end of the resistor 146, as shown, through the variable resistor 154, to the base electrode 118, and from the right end of the resistor 148, as shown, to the emitter electrode 114. The circuit for applying a measure of the resulting voltage appearing across both the resistors 146 and 148 between the base electrode 126 and the emitter electrode 122 of the transistor 120 extends from the right end of the resistor 146, as shown, through the variable resistor 156, to the base electrode 126, and from the right end of the resistor 148, as shown, to the emitter electrode 122.

The phase-shifting circuit 22 is a well known type and comprises a saturating reactor 162, a capacitor 164, a resistor 166, blocking rectifiers 168, 170, 172 and 174, and a saturable reactor 176. As illustrated, the saturable reactor 176 includes a three-legged magnetic core member 178, load windings 180 and 182 disposed in inductive relationship with the outer legs of the magnetic core member 178, and a control winding 184 disposed in inductive relationship with the middle leg of the magnetic core member 178. Energy for the load windings 180 and 182 is received from a potential transformer 186.

In this instance, the ignitron rectifier circuit 24 comprises two ignitron rectifiers 188 and 190 which are supplied from a potential transformer 192 and are connected to control the magnitude of the direct-current voltage appearing between the bus conductors 12 and 14. The conductivity of the ignitron rectifiers 188 and 190 and thus the magnitude of the voltage between the bus conductors 12 and 14 is controlled in accordance with the firing angle of the voltages applied to the ignitron rectifiers 188 and 190 by the phase-shifting circuit 22. The firing angle of the voltages applied to the ignitron rectifiers 188 and 190 is, in turn, determined by the impedance of the load windings 180 and 182 of the saturable reactor 176 as controlled by the control winding 184.

In order that the average value of the current flowing through the control winding 184 of the saturable reactor 176 varies in accordance with the conductivity of the transistors 96, 104, 122 and 120, the control winding 184 and the secondary winding 90 of the potential transformer 80 are interconnected with the emitter-collector electrodes of the transistors 96, 104, 122 and 120. In particular, one end of the control winding 184 is connected to one of the output terminals of a full-wave dry-type rectifier 194 whose input terminals are connected to the secondary winding section 90 of the potential transformer 80. The other output terminal of the rectifier 194 is connected to the collector electrodes 108 and 100 of the transistors 104 and 96, respectively, and the other end of the control winding 184 of the saturable reactor 176 is connected to the emitter electrodes 122 and 114 of the transistors 120 and 112, respectively. Thus, the rectifier 194 rectifies the current received from the secondary winding section 90 of the potential transformer 80 and the transistors 96, 104, 112 and 120 control the magnitude of the average direct current flowing through the control winding 184 of the saturable reactor 176.

A resistor 196, of relatively high resistance, is connected between the collector electrode 108 and the emitter electrode 106 of the transistor 104 and between the collector electrode 100 and the emitter electrode 98 of the transistor 96, and a resistor 198, of relatively high resistance, is connected between the collector electrode 124 and the emitter electrode 122 of the transistor 120 and between the collector electrode 116 and the emitter electrode 114 of the transistor 112 in order to equalize the voltage from collector electrodes 100 and 110 to emitter electrodes 98 and 106 and the voltage from collector electrodes 116 and 124 to emitter electrodes 114 and 122 and thus prevent damage thereto. A rectifier 200 is connected across the control winding 184 of the saturable reactor 176 in order to prevent the inductive surge from the control winding 184 from passing through the transistors 96, 104, 112 and 120 when they are biased off.

By controlling the switching transistors 96, 104, 112 and 120 in accordance with the chopped sine wave output current of the magnetic amplifier 18 and by synchronously applying alternating voltages of sine-wave shape to the load windings 72 and 74 of the magnetic amplifier 18 and to the output circuit of the switching circuit 20 as effected by the secondary winding sections 84 and 90 of the potential transformer 80, the average value of the direct current flow through the control winding 184 of the saturable reactor 176 varies linearly with changes in the magnitude of the direct current flow through the control windings 92 and 94 of the magnetic amplifier 18.

Those familiar with the art will realize that there is a linear relationship between the input current and average output current of a self-saturated magnetic amplifier, at least over an appreciable range. The magnetic amplifier acts as a synchronous switch and upon saturation applies the supply voltage to its load. If transistors used as synchronous switches are saturated at the same time that the magnetic amplifier saturates and on saturation apply a voltage wave shape to their load that is of the same shape as the voltage the magnetic amplifier applies to its load, then the linear relationships may be extended to the current in the transistor load.

The operation of the regulator system 10 will now be described. Assuming the direct-current voltage between the bus conductors 12 and 14 is at the regulated value then the junction point between the resistors 28 and 34 is at a higher potential than the junction point between the Zener diode 26 and the resistor 44. Such being the case, current flows from the junction point of the resistors 28 and 34 through the emitter and base electrodes 50 and 54 of the transistor 48 to the junction point of the Zener diode 26 and the resistor 44. This current flow is amplified by the transistor 48 and the output current of the transistor 48 is amplified by the transistor 56. The amplified output current of the transistor 56 flows through the control windings 92 and 94 of the magnetic amplifier 18 to alternately reset the flux level in the magnetic core members 68 and 70 to a predetermined level when current is not flowing through the associated load windings 72 and 74, respectively. Then when the polarity of the voltage across the secondary winding section 84, of the potential transformer 80, is as shown in the drawing the magnetic core member 70 is driven to saturation. Once the magnetic core member 70 has been driven to saturation, current having a chopped sine-wave shape flows from the upper end of the secondary winding section 84, as shown, through the self-saturating rectifier 78, the load winding 74 of the magnetic amplifier 18, the current-limiting resistor 130, the primary winding 134 of the current transformer 132, the rectifier 140, the resistor 146, the rectifier 140, to the lower end of the secondary winding section 84, as shown, to thus render the transistors 96, 104, 112 and 120 conductive. As hereinbefore mentioned, the width of this chopped sine wave pulse determines how long the transistors 96, 104, 112 and 120 remain conductive.

During this same half-cycle of operation when the transistors 96, 104, 112 and 120 are conductive current flows from the upper end of the secondary winding section 90, as shown, through the rectifier 194; the control winding 184 of the saturable reactor 176; the parallel circuit; one branch of which includes the emitter electrode 122 and the collector electrode 124 of the transistor 120 and the emitter electrode 106 and the collector electrode 108 of the transistor 104, and the other branch of which includes the emitter electrode 114 and the collector electrode 116 of the transistor 112 and the emitter electrode 98 and the collector electrode 100 of the transistor 96; and the rectifier 194; to the lower end of the secondary winding section 90 of the potential transformer 80, as shown. The current flow through the control winding 184 of the saturable reactor 176, under the assumed condition of the voltage between the bus conductors 12 and 14 at the regulated value, effects a predetermined firing angle for the voltages applied to the ignitron rectifiers 188 and 190 of the ignitron rectifier circuit 24.

During the next half-cycle of operation when the polarity of the voltages across the secondary winding sections 84 and 90 of the potential transformer 80 are opposite from that shown in the drawing the magnetic core member 68 of the magnetic amplifier 18 is driven to saturation. Once the magnetic core member 68 has been saturated current having a chopped sine-wave shape flows from the lower end of the secondary winding section 84, as shown, through the rectifier 140, the resistor 146, the rectifier 140, the primary winding 134 of the current transformer 132, the current-limiting resistor 130, the load winding 72, the self-saturating rectifier 76 of the magnetic amplifier 18, to the upper end of the secondary winding section 84, as shown, to thus render the transistors 96, 104, 112 and 120 conductive. During the same half-cycle of operation when the transistors 96, 104, 112 and 120 are conductive, current flows from the lower end of the secondary winding section 90, as shown, through the rectifier 194, the control winding 184 of the saturable reactor 176, the hereinbefore mentioned parallel circuit including the transistors 120, 104, 112 and 96, and the rectifier 194, to the upper end of the secondary winding section 90, as shown.

Assuming the voltage between the bus conductors 12 and 14 increases to a value above the regulated value then the junction point of the resistors 28 and 34 becomes more positive with respect to the junction point of the Zener diode and the resistor 44 and the magnitude of the current flow through the emitter electrode 50 and the base electrode 54 of the transistor 48 increases. Such an action increases the magnitude of the current flow through the control windings 92 and 94 of the magnetic amplifier 18 to thus reset the flux level in the magnetic core members 68 and 70 to a lower level than when the voltage between the bus conductors 12 and 14 was at the regulated value. This in turn decreases the width of the chopped sine waves flowing through the resistors 142 and 146 of the switching circuit 20. Thus, the transistors 96, 104, 112 and 120 conduct for a shorter period of time and the average value of the direct current flowing through the control winding 184 of the saturable reactor 176 decreases. A decrease in the current flow through the control winding 184 delays the firing angle of the voltages applied to the ignitron rectifiers 188 and 190 and thus returns the voltage between the bus conductors 12 and 14 to the regulated value.

Assuming the voltage between the bus conductors 12 and 14 decreases to a value below the regulated value then the junction point of the resistors 28 and 34 becomes less positive with respect to the junction point of the Zener diode 26 and the resistor 44 and thus the magnitude of the current flow through the control windings 92 and 94 of the magnetic amplifier decreases and the flux level in the magnetic core members 68 and 70 is reset to a lesser level than when the voltage between the bus conductors 12 and 14 was at the regulated value. This increases the width of the chopped sine waves flowing through the resistors 142 and 146 of the switching circuit 20. This causes the transstors 96, 104, 112 and 120 to conduct for a longer period of time and the average value of the current flowing through the control winding 184 of the saturable reactor 176 increases. An increase in the average value of the current flowing through the control winding 184 advances the firing angle of the voltages applied to the ignitron rectifiers 188 and 190 to thus return the voltage between the bus conductors 12 and 14 to the regulated value.

As illustrated in the drawing, the ignitron rectifiers 24 would serve as the sole means for supplying power to the lines 12 and 14. However, other sources of power could also feed the lines 12 and 14 if suitable means (not shown), well known in the art, were added to allow for parallel operation of several sources of power and to insure proper load sharing among the various power sources operating in parallel.

It is to be understood that the combination of the sensing circuit 16, the magnetic amplifier 18 and the switching circuit 20 could be used in a regulator loop which maintains the output of a dynamo-electric machine substantially constant. Further, the switching circuit 20 could comprise more or less than four transistors as determined by the load current and voltage.

The apparatus embodying the teachings of this invention has several advantages. For instance, the magnitude of the direct-current output from the switching circuit 20 varies linearly with changes in the magnitude of the current flow through the control windings 92 and 94 of the magnetic amplifier 18. In addition, the regulator system 10 except for the ignitron rectifier circuit 24 comprises static components thus minimizing maintenance problems. Further, the regulator system 10 has a high speed of response.

Since numerous changes may be made in the above apparatus and circuits, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system energized from an alternating-current source and controlled from a direct-current source to supply energy to a load, the combination comprising, a magnetic amplifier including magnetic core means and a load winding and a control winding disposed in inductive relationship with the magnetic core means, the control winding being responsive to the direct-current source, a semiconductive device having three electrodes, circuit means for interconnecting the load winding with the alternating-current source and with two of said three electrodes so that the load winding is energized from the alternating-current source and so that the conductivity of the semiconductive device is controlled in accordance with the current flow through the load winding, and other circuit means for interconnecting the load with the remaining electrode of the said three electrodes and with one of said two of said three electrodes so that the current flow through the load varies in accordance with the conductivity of the semiconductive device.

2. In a control system energized from an alternating-current source and controlled from a direct-current source to supply energy to a load, the combination comprising, a magnetic amplifier including magnetic core means and a load winding and a control winding disposed in inductive relationship with the magnetic core means, the control winding being responsive to the direct-current source, a semiconductive device having three electrodes, circuit means for interconnecting the load winding with the alternating-current source and with two of said three electrodes so that the load winding is energized from the alternating-current source and so that the conductivity of the semiconductive device is controlled in accordance with the current flow through the load winding, and other circuit means for interconnecting the load and the alternating-current source with the remaining electrode of the said three electrodes and with one of said two of said three electrodes so that the current flow through the load varies in accordance with the conductivity of the semiconductive device.

3. In a control system energized from an alternating-current source and controlled from a direct-current source to supply energy to a load, the combination comprising, a self-saturating magnetic amplifier including magnetic core means, a series circuit including a self-saturating rectifier and a load winding disposed in inductive relationship with the magnetic core means, and a control winding disposed in inductive relationship with the magnetic core means, the control winding being responsive to the direct-current source, a semiconductive device having three electrodes, circuit means for interconnecting the series circuit with the alternating-current source and with two of said three electrodes so that the load winding is energized from the alternating-current source and so that the conductivity of the semiconductive device is controlled in accordance with the current flow through the load winding, and other circuit means for interconnecting the load and the alternating-current source with the remaining electrode of the said three electrodes and with one of said two of said three electrodes so that the current flow through the load varies in accordance with the conductivity of the semiconductive device.

4. In a control system energized from an alternating-current source and controlled from a direct-current source to supply energy to a load, the combination comprising, a self-saturating magnetic amplifier including magnetic core means, a series circuit including a self-saturating rectifier and a load winding disposed in inductive relationship with the magnetic core means, and a control winding disposed in inductive relationship with the magnetic core means, the control winding being responsive to the direct-current source, a junction-type transistor having an emitter electrode, a collector electrode, and a base electrode, a transformer having a primary winding and two secondary winding sections, the primary winding being responsive to the alternating-current source, circuit means for interconnecting said series circuit and the base electrode and the emitter electrode of the junction-type transistor with one of said two secondary winding sections so that a voltage proportional to the output current of the self-saturating magnetic amplifier is applied between said base electrode and said emitter electrode, and other circuit means for interconnecting the load and said collector electrode and the said emitter electrode with the other of the said two secondary winding sections so that the junction-type transistor controls the flow of current to the load.

5. In a regulator system energized from an alternating-current source for maintaining an electrical quantity substantially constant, the combination comprising, a sensing circuit for producing a direct-current error signal which is a measure of the deviation of the electrical quantity from its regulated value, a magnetic amplifier including magnetic core means and a load winding and a control winding disposed in inductive relationship with the magnetic core means, the control winding being responsive to the direct-current error signal, a semiconductive device having three electrodes, circuit means for interconnecting the load winding with the alternating-current source and with two of said three electrodes so that the load winding is energized from the alternating-current source and so that the conductivity of the semiconductive device is controlled in accordance with the current flow through the load winding, an ignitron rectifier circuit for controlling the magnitude of said electrical quantity, a phase-shifting circuit, including a control winding, for controlling the operation of the ignitron rectifier circuit, and other circuit means for interconnecting the control winding of the phase-shifting circuit and the alternating-current source with the remaining electrode of the said three electrodes and with one of said two of said three electrodes so that the current flow through the control winding of the phase-shifting circuit varies in accordance with the conductivity of the semiconductive device.

6. In a regulator system energized from an alternating-current source for maintaining an electrical quantity substantially constant, the combination comprising, a sensing circuit for producing a direct-current error signal which is a measure of the deviation of the electrical quantity from its regulated value, a self-saturating magnetic amplifier including magnetic core means, a series circuit including a self-saturating rectifier and a load winding disposed in inductive relationship with the magnetic core means, and a control winding disposed in inductive relationship with the magnetic core means, the control winding being responsive to said direct-current error signal, a junction-type transistor having an emitter electrode, a collector electrode, and a base electrode, a transformer having a primary winding and two secondary winding sections, the primary winding being responsive to the alternating-current source, circuit means for interconnecting said series circuit and the base electrode and the emitter electrode of the junction-type transistor with one of said two secondary winding sections so that a voltage proportional to the output current of the self-saturating magnetic amplifier is applied between said base electrode and said emitter electrode, an ignitron rectifier circuit for controlling the magnitude of said electrical quantity, a phase-shifting circuit, including a control winding, for controlling the operation of the ignitron rectifier circuit, and other circuit means for interconnecting the control winding of the phase-shifting circuit and the other of the said two secondary windings with said collector electrode and with the said emitter electrode so that the current flow through the control winding of the phase-shifting circuit varies in accordance with the conductivity of the junction-type transistor.

7. In a regulator for maintaining an electrical quantity at a predetermined value, the combination comprising a sensing means for producing a signal which is a measure of the deviation of the electrical quantity from its predetermined value, a magnetic amplifier responsive to the signal produced by said sensing means, semiconductor switching means responsive to the output of said magnetic amplifier, and a phase-shifting means controlled by the output from said semiconductor switching means for maintaining said electrical quantity at its predetermined value.

References Cited in the file of this patent

UNITED STATES PATENTS

| | | |
|---|---|---|
| 2,057,520 | Gulliksen | Oct. 13, 1936 |
| 2,697,197 | Brown | Dec. 14, 1954 |
| 2,759,142 | Hamilton | Aug. 14, 1956 |